United States Patent Office 3,408,747
Patented Nov. 5, 1968

3,408,747
PROCESS FOR CONDITIONING GRAIN
Sylvester L. Steffen, New Hampton, Iowa 50659
No Drawing. Filed Apr. 24, 1967, Ser. No. 632,889
4 Claims. (Cl. 34—15)

ABSTRACT OF THE DISCLOSURE

This invention pertains to a process of conditioning grain in a storage bin having a closeable roof opening, a plenum chamber defined by the bottom of the bin and a perforated floor, an air blower operable to force air into the plenum chamber, and a heater attached to the blower for heating the air blown into the plenum chamber when desired. The invention includes the process of depositing grain into the bin in a level manner, operating the blower to force air into the plenum chamber, measuring by means of a thermometer the temperature of the air within the plenum chamber, and by means of a static psychrometer the wet-bulb temperature depression of the air within the plenum chamber, and by means of a manometer the volume of air being introduced into the plenum chamber, continuing the depositing of grain into the bin while maintaining a predetermined ratio of air volume for volume of deposited grain, operating the heater to maintain a predetermined temperature of from 50° F. to 70° F. within the bin if the ambient air temperature falls below 50° F., and continuing the circulation of air until the grain is dried to a desired final moisture content.

BACKGROUND OF THE INVENTION

*Field of the invention.*—The field of art to which this invention pertains is generally the art and process of conditioning and drying of grain in bulk with air, taking into consideration air quantities and air quality, their interactions and requirements of each to preserve the biological quality of the grain.

*Description of the prior art.*—There are two different ways to dry shelled corn in a round bin equipped with perforated floor, fan and heater: Multiple layer drying and bin batch drying. With multiple layer drying, the corn is dried and stored in the same bin. The wet corn is dried in layers up to four or five feet deep. After a layer of corn dries, another layer of wet corn can be added. A total depth of sixteen to twenty feet of corn can be dried by multiple layer drying. The corn is dried with air that is raised 15° to 20° F. Bin batch drying requires the same drying equipment as the multiple layer drying method, but the drying is accomplished differently. The bin is loaded with two and one-half to three feet of wet corn. The corn is dried, cooled and then unloaded. Then another layer, or batch, can be dried. Corn is dried faster, because the heater is adjusted to raise the temperature of the drying air to 120–140° F.

In both of these methods, either the heating temperature is too high or air requirements for proper cooling are not taken into proper consideration such that the respiration rate of the kernel germ becomes too rapid. This may result in the germ eating up the food of the kernel too fast, causing the death of the germ and decomposition thereof. This problem of the prior art has been solved by the present method spelling out air requirements (CFM/BU) and the temperature (in degrees Fahrenheit) to be used in conditioning corn for maximum preservation of quality. There are many different measures of quality depending upon differing uses. However, the farmer is merely the producer of a raw material (corn) which he wants to keep in the best possible condition no matter how the corn is used. There is one practical, universally acceptable index of quality, namely germination. A kernel that grows is in the best quality status for all potential uses.

The quality of corn can be made a clear-cut item to the farmer in terms of germination. There is research showing that a one percent loss or more of the initial dry matter (DM) of corn may result in "sample grade" corn for which the country elevators dock the farmer in his return. This happens sixty percent of the time, and is thus excessive. Further research has shown that a 14.7 gram evolution of $CO_2$ per kilogram initial dry matter corresponded with a one percent loss of dry matter, and thus equalling sample grade. Research by the applicant showed that certain air flow requirements as set forth hereinafter maintained a germination level above eighty percent which corresponded to less than a 14.7 gram evolution of $CO_2$ per kilogram dry matter, wherein less than one percent loss of dry matter occurred. Below that germination, one percent or more loss of dry matter was had.

Furthermore, by the inclusion of air flow requirements into the prior art formula which included temperature and relative humidity controls, an additional bin drying method was developed, namely a "daily fill" approach as compared to the multiple layer drying and bin batch drying methods.

HISTORICAL SIGNIFICANCE

The era of the 20th century brings man closer than ever to mastery of his need for food and fiber. Yet today's starving masses make is obvious that this mastery is still an unattained reality. The potential of realizing this age-old dream of humankind may have been discovered within the decade, for in working with the life-regulating genes in corn it has been possible to improve the food balance and value of this cereal grain by increasing its protein availability. History may prove this event as one of the most significant in human history. (Reference is made to Opaque-2 Gene in corn regulating lysine and tryptophan content in corn.)

Yet, the ability to produce life-giving grain may be of little value if we lack the ability to preserve its life-giving quality. Preservation of this quality requires an understanding of the vital processes at work within this seed and the control of them.

The grain kernel is two things, it is a living being (germ) and it is a living being equipped with a food package (endosperm). The vital processes of the germ determine how fast the germ itself will degenerate and how fast and to what extent the food store will be consumed. Besides the germ itself, there are other organisms, molds, bacteria and viruses competing for the food supply of the kernel. Unfortunately, environmental conditions that accelerate the vital processes of the germ also favor those of the parasite organisms; fortunately, environmental conditions that control the vital processes of the germ also control those of the parasites.

It is the object of this invention to describe environmental conditions and controls that regulate and preserve the good quality of grain. More specifically, it is the object of this invention to describe a method and device, which make it possible and practicable in a widespread and universally applicable way to regulate and control quality grain in bulk. The parameters applied and the specific descriptions given apply to corn, ZEA maize, but broadly do apply to the seeds of all grains.

Temperature and moisture are the two factors which control and regulate the chemical and biochemical processes that occur in grain. The interaction and relationship of these factors will be described in so far as they contribute to the chemical and biological development and stabilization of the ingredients of greatest economic value. And, since about 85% of the mature corn kernel consists of starch (76%) and protein (9%), overall preservation of these and maintenance of the biological identity of the kernel, i.e., viability, are considered indices of the economic value of the product.

*Starch:* Synthesis and hydrolysis. Sugars, starch and cellulose belong to a large family of chemical compounds occurring in nature called carbohydrates.

Carbohydrates are classified on the basis of the number of simple sugars (saccharides) to which they can be broken down by hydrolysis.

The simple sugars such as xylose (a pentose), glucose and fructose (hexoses) are called monosaccharides. Sucrose, lactose and maltose can each be hydrolyzed to *two* simple sugars and are therefore disaccharides. The sugar known as raffinose yields *three* simple sugars on hydrolysis and is a trisaccharide. Complex sugars in general are called polysaccharides. Generally speaking the biological stability of carbohydrates is greater the more complex it is, i.e., simple sugars are least stable and more prone to deterioration. Starch and cellulose are high-molecular-weight compounds called colloidal polysaccharides with greater chemical stability. In the seed (corn), sugars are present to provide for respiration in the germ, starches are stored in abundance as a food reserve while cellulose serves mainly as a structural material.

The point of interest here is the synthesis of simple sugars and starches and the hydrolysis of starches to simple sugars and the release of energy (chemical) from sugars in the processes of respiration and fermentation (glycolysis); also, the effects of these processes on the condition of the kernel.

Synthesis of sugar involves a series of photochemical reactions in which carbon (from $CO_2$) is removed from the air by plants in a process called photosynthesis. This overall process is generally described by this chemical equation: $nCO_2 + nH_2O \leftrightarrow n(CH_2O) + nO_2$. Any given number of molecules are signified by $n$. The process from which simple sugars convert to starches are generally described in this manner:

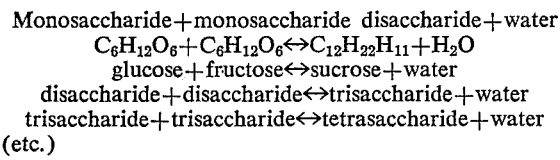

Starch molecules are chemically inclined to assume a stable configuration and so the steps that lead to the condensation of carbohydrates will proceed as long as conditions allow.

The manufacturing of sugars and starch within the plant take care of two vital needs. The plant's own growth and development require sugar for respiration (energy for growth) and starches and cellulose for development of the plant system. (Respiration is the reverse of photosynthesis in that chemical energy is released from the sugar which originally was put together in photosynthesis; with the action of oxygen, carbon dioxide and energy are released.) The second need that the manufacture of sugars and starch serve is the production of the seed which guarantee preservation of the species. With the mature development of the seed an abundant reserve of food is provided and is available to the seed (embryo) when conditions for germination are favorable.

The kernel of corn, being a living organism, experiences constant respiration. A certain amount of simple sugars are required for this. If, however, the food stores have not matured, i.e., they exist mainly in a sugar state rather than starch, the rate of respiration is more rapid with greater depletion of the food stores and a consequent greater loss of dry weight. Similarly, if the kernel has matured but adequate moisture is present the starch will be broken down (hydrolyzed) to simple sugars with more rapid respiration and even fermentation, with again increased losses of dry matter.

The pathways for synthesis of starches in the cell involve many enzymatic steps utilizing the phosphate esters of sugars as intermediates. The degradation of starches however comes much easier. A variety of specific enzymes are found in plant and animal tissues and in micro-organisms which catalyze the addition of water (hydrolysis) to bring about the formation of free monosaccharides.

When "wet corn" is put in bulk in storage (tight) a process called fermentation takes place. In sales literature this is often described as a desirable method of "processing the corn."

The process of fermentation (glycolysis) is defined as a biochemical conversion of sugars and starches to lactic acid with the release of chemical energy. In the fermentation of grain yeast cells act to break down the sugars with the release of ethyl alcohol and chemical (heat) energy.

The energy released in glycolysis is derived from the rearrangement of the atoms of carbon and hydrogen to an energy-poorer form without the actual oxidation of sugar (glucose) to carbon dioxide and water. The significance of this in corn fermentation is that there is loss of chemically bonded energy, which energy would actually be available to an animal when consumed; it is therefore a loss of food energy and an obvious economic loss.

In a "wet corn" structure the yeast activity is immediately very prolific so that the production of $CO_2$ is very rapid. This $CO_2$ is mostly retained so that within 24 hours the available oxygen is consumed while the $CO_2$ concentration rapidly approaches 100%. At this point all organisms, including the corn, which depend on oxygen (aerobic) are killed. From here on, experimental knowledge of actual biologic activity within the grain mass in these structures is nil.

It is known that many cases of anaerobic glycolysis (break-down of sugar without oxygen) exist in nature. As a matter of fact this process is the only means of metabolically deriving energy from carbohydrates without oxygen. It is postulated that anaerobic glycolysis carries on in the grain mass after the aerobic action of yeast is destroyed. Yeasts do ferment sugars anaerobically.

It was found in measuring actual grain temperatures within a "wet corn" structure that grain temperatures in many instances remained well above 100° F. over periods of days at a time, even during winter months. Such heat energy could only be derived from the grain itself. The maintenance of such temperatures necessarily presupposes a very considerable release of chemically bonded energy from the corn with a significant degradation of food energy and loss of dry matter.

Experimental knowledge in terms of feeding results with "wet corn" structures is quite vast. More and more it is the experience of people with these systems that the feeding value of mature, unfermented corn is greater; this is true because biochemical deterioration is minimized.

*Protein:* Synthesis and hydrolysis. Proteins are large groups of complex, nitrogen containing organic substances of high molecular weight, widely diversified in function, and essential to the structure and functioning of all living things.

The synthesis (production) of proteins from amino acids in living things is characteristic of growth and maintenance. It is a highly specific and apparently invariant process.

Protein synthesis is a complex series of successive enzyme-catalyzed reactions by which amino acids are condensed together to form specific proteins. This synthesis normally occurs in living cells.

For the cell the problem of protein synthesis is twofold; energy is required to form the peptide bond (see chemical equation) which connects the two amino acids, and the amino acids must be linked in a certain sequence.

The synthesis of protein involves the removal of water from amino acids and requires expenditure of energy. When a molecule of water is eliminated from the amino group of one acid and the acid group of a second amino acid, a peptide bond is formed, and the product is a dipeptide. Similarly, when water is removed from a dipeptide and a third amino acid, a tripeptide results; stepwise, continuation of the process leads to a polypeptide, a linear array of amino acid units connected by peptide bonds. Proteins may contain one or more polypeptide chains; if more than one, strong interactions or chemical bonding between chains prevent them from separating.

In the development of the corn kernel, it was found that the simpler amino acids undergo rapid condensation as the corn kernel matured which is chiefly a condensation of amino acids into polypeptides.

TABLE 1.—DISTRIBUTION OF NITROGEN IN THE SEED OF ZEA MAIZE AT DIFFERENT STAGES OF MATURITY

|  | Milk Stage | Intermediate | Mature |
|---|---|---|---|
| Non-Protein Nitrogen, percent | 41 | 32 | 15 | 3 |
| Nitrogen not peptized, percent | 35 | 30 | 30 | 27 |
| Glutelin, percent | 10 | 15 | 15 | 13 |
| Globulin, percent | 7 | 6 | 7 | 6 |
| Prolamine (Zein), percent | 4 | 14 | 30 | 48 |
| Proteose (peptone), percent | 3 | 3 | 3 | 2 |

Zein (prolamine), a specific corn protein is apparently a protein consisting of a number of polypeptide chains which make it a very stable protein. Zein is to be found in the endosperm and not in the germ. The biological value of zein is low, i.e., the chemical energy is bonded so tightly that animal systems cannot readily recover it.

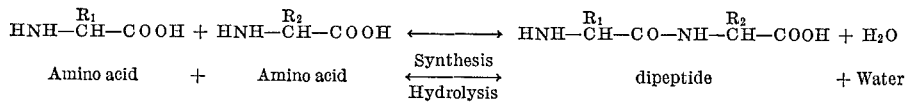

$$\text{HNH}-\overset{R_1}{\underset{}{\text{CH}}}-\text{COOH} + \text{HNH}-\overset{R_2}{\underset{}{\text{CH}}}-\text{COOH} \xrightleftharpoons[\text{Hydrolysis}]{\text{Synthesis}} \text{HNH}-\overset{R_1}{\underset{}{\text{CH}}}-\text{CO}-\text{NH}-\overset{R_2}{\underset{}{\text{CH}}}-\text{COOH} + \text{H}_2\text{O}$$

Amino acid + Amino acid     dipeptide + Water

Protein hydrolysis is the reverse of protein synthesis. When simple proteins are subjected to hydrolysis (usually accelerated by the presence of acid and heat) they are broken down completely into amino acids.

Very commonly simple proteins combine with non-protein groups to form conjugated proteins. Upon hydrolysis these give rise to other substances besides amino acids. For example, pepsin (an enzyme) is a phosphoprotein because it yields phosphoric acid and amino acid upon hydrolysis. Egg albumin is a glyco-protein because the additional material formed on hydrolysis is a carbohydrate.

In studies of the deterioration of corn with storage (both high-moisture and dry corn), it was found that the higher the moisture content of the corn and the longer it was held, the greater was the diversity of amino acids recovered with the chromatographic method. This was explained as the hydrolysis of the protein system of the kernel. The mold population of the high-moisture corn was found to be very prolific and it was assumed that some of the amino acids recovered were certainly obtained from the molds themselves. These studies showed that higher moisture content corn showed a greater overall deterioration of the protein system, and more so the longer it was held.

These observations are corroborated in actual experience in feeding high-moisture corn; it has been generally observed that the longer high-moisture corn is kept and the higher the actual moisture content is, the more protein supplement is required.

In the corn kernel it is found that the starch granules lie embedded in a proteinaceous matrix within the cells of the endosperm. This proteinaceous matrix often constitutes a relatively important part of the cell content, as in the horny endosperm, and consequently the entire cell content goes to make up the flour particle with dry milling. In hard wheat flours this is true. Whereas in the floury endosperm the protein matrix is not strong enough to hold all the cell content together.

For wet milling, the proteinaceous matrix must be sufficiently broken down to free the starch granules once the cell walls are broken. This is accomplished by the use of sulfur dioxide in the steep. The sulfurous acid formed acts as a reducing agent (hydrolyzer) which in part dissolves (hydrolyzes) and in part merely disperses the proteinaceous matrix.

Above 120° F. temperature, protein begins to be denatured, which destroys its ability to be hydrolyzed. Thus, one can see the disadvantage of exposing grain to too high temperatures in that the protein is rendered less valuable both as feed and both as a commercial product since protein denaturation is irreversible. Germ-type protein (amino acid) has high biological value, i.e., its bonded energy is readily recovered by the animal system.

SUMMARY OF THE INVENTION

In brief, the present method, termed the thermanometric method of conditioning grain in storage, is a method designed to create and maintain environmental conditions that preserve the biological and chemical identity of the grain; which conditioning process employs the controlled use of air requirements in specific ratio to the size of the bin being used to dry the grain, the type of air blower being used, the moisture of the grain being dried, the ambient temperature, a specific range of temperature of the air within the bin plenum chamber, and the static pressure of the air within said chamber to provide a dried product with a controlled final moisture content; and wherein the drying process maintains conditions to preserve a minimum germination level of 80%, with seasonally adjusted temperatures to minimize chemical and/or biological alterations within the kernel in the process of its being conditioned and stored.

DESCRIPTION OF THE PREFERRED EMBODIMENT

This invention relates generally to a method of drying grain for storage and more particularly to a process for conditioning grain.

In the past two decades the practice of drying grain, and particularly corn, has come from a background of relative obscurity to that of universal recognition. High yielding, late-maturing hybrids, the practice of field-shelling, and early harvesting all point to the essential role that artificial conditioning must play in grain handling.

One factor often overlooked in the engineering of storing, drying and handling systems, is that grain is a living organism. A kernel of grain includes the germ and the endosperm with each contributing to the economic value. The germ contains 84% of the oil, 80% of the ash, 70% of the sugar, 22% of the protein and 2% of the starch of the kernel. The endosperm contains 98% of the starch, 75% of the protein, 28% of the sugar, 16% of the ash, and 15% of the oil of the kernel. The bulk of the kernel is in the endosperm and provides the food for the germ as it breathes, with the rate of the breathing determining the rate at which the food is consumed. Conditions favorable to rapid respiration also favor activity by mold and bacteria. Therefore, control of the rate of respiration and outside biological influences will control the undesirable consumption of stored food within the kernel. It has also been learned that if the germ is dead, the kernel will more rapidly decompose. A practical, universal index of quality of grain for seed, feeding and milling is based on germination. A kernel that grows is in best condition for whatever purpose.

The primary controlling factors of the rate of respiration, decomposition and outside biological influences are temperature and moisture. Increases in either or both of these factors increases the biological activity, therefore control of these factors is of utmost importance. A third factor which must be considered is the condition of the shell of the kernel. Damage to the shell such as cracking or breaking also encourages biological activity and also decreases the marketability of the grain.

Research has shown that corn is not physiologically mature until moisture content is reduced to approximately 20%, that is, above this level the ingredients lack chemical stability, however, removal of moisture may achieve a high degree of chemical stabilization.

Furthermore it is advantageous to harvest corn as soon as possible, for if left in the field to mature, losses are incurred due to uncertainty of weather and predators, such as insects, birds, blight and mold. Early harvesting assists in better quality control and allows the farmer to fall plow. Corn can be harvested and field shelled, with minimal damage to the kernels, when the moisture content reaches 27% to 28%. Field shelling at higher moisture contents appreciably increases kernel damage and therefore must be avoided.

If corn is to be used as seed, two factors affect its value, germination and seedling vigor. Germination and vigor are both affected by high temperatures and loss of food from the endosperm. To the feeder and feed manufacturer, quality in corn is seen in terms of available protein; to the wet miller, high starch and oil contents are important. Therefore, it is important, to the seed producer, the feeder and feed manufacturer, and the wet miller that proper conditioning of grain be developed and maintained.

It is an object of this invention to provide a method for conditioning or drying grain wherein the viability and vigor of the grain remains unaffected.

Another object of this invention is the provision of a method of conditioning grain wherein the grain is chemically stabilized during the conditioning process.

A further object is to provide a method of conditioning corn which allows the early harvesting of the kernels having a moisture content of approximately 27%, and yet provides proper quality control of the corn, reduces field loss, provides economical drying costs, and allows fall plowing.

Yet another object of this invention is the provision of a method for conditioning corn whereby the loss of oil in the kernel is minimized, thus providing a kernel which is more valuable for feeding, and which has corn "lustre," a factor important in commercial uses of the corn.

Still another object of this invention is to provide a method of conditioning grain wherein the temperature used to dry the grain is maintained in a biologically safe range while extracting the moisture to a desired final level.

Yet a further object is the provision of a method of conditioning grain wherein gradual drying is accomplished by the use of no heat, or at most low heat, and with most effective use of air volume during drying.

A still further object of this invention is to provide a method of conditioning grain wherein the air requirements as to quantity and temperature are preset, dependent only on the moisture content of the grain and the outside temperature.

Another object is the provision of a method of conditioning grain which encompasses a clear guide on the amount of grain that can be placed in a bin for drying based on the moisture content of the grain and the amount of air and temperature of the air required to dry the grain for maximum preservation of the quality of the grain.

Comparative studies of shallow-bed and deep-bed drying were performed under varying conditions of air temperature and volume to indicate the effects of temperature and drying method on grain quality and viability.

Yellow dent hybrid corn was field shelled at approximately 47%, 38% and 28% moisture, which corresponds to approximately 32%, 27% and 22% moisture on the fresh weight basis, and placed in a shallow-bed dryer. The dryer had a false floor made of screen, and air at various controlled temperatures was forced into the area underneath the grain wherein it flowed upwardly through the screen and grain. The rate of drying and temperatures were followed closely throughout the tests to insure that proper data were secured. A check sample for each initial moisture was obtained at the time the dryer was loaded. This check sample was spread on a screen and exposed to the open air for about three weeks, after which it was sealed and kept under refrigeration at 35° to 40° F. for two months before the final moisture content and germination percentages were determined.

To analyze the effect of temperature on germinability and vigor three germination methods were employed.

The first test was a rag doll test. Four replications of fifty seeds each were rolled in paper blotters, kept moist and germinated in an incubator with an alternating temperature of 68° and 86° F. A count was made after seven days with a recording of deformed seedlings and of those less than one inch.

The second method employed the standard seed laboratory test for germination in sand. The kernels were planted about one and one-half inch deep in clean sand under constant illumination. The temperature was maintained between 80° and 86° F. In planting, only those seeds were selected which showed no sign of damage from mechanical handling. Four replications of 50 seeds each were used. After five days the emerged seedlings were counted and recorded; again after two more days the final count was taken, recording at the same time the stunted and deformed seedlings.

The final germination was the cold test, commonly employed in the seed laboratory as a test of seedling vigor. Two replications of 50 seeds each were put in transparent germination containers and covered with a mixture of sand and field soil containing spores of fungi which attack corn. Sufficient water was added to maintain approximately 65% soil saturation in the containers. The containers were then held for seven days at about 50° F., giving the molds an opportunity to invade the corn. After seven days the germination containers were put in the germination room under constant light and temperature for four days; after which time the seedlings were counted and the percent germination determined. The stunted and deformed seedlings were again recorded as in the other tests.

Yellow dent hybrid corn was field shelled at approximately 27%, 25% and 19% moisture on the fresh weight basis, and dried under various controlled temperature conditions in a column to determine the effects of temperature and moisture in deep-bed drying. At each quarter level in the column, sampling tubes were placed and connected to an infra-red gas analyzer which recorded volume concentrations of carbon dioxide at each of these levels. A moisture sensing element was placed at each eighth level to permit observation of grain temperature and the movement of the drying front. Temperature readings were observed throughout; also a running record was kept of the dry bulb and wet bulb ambient temperatures.

After drying, the grain was placed in cold storage for six to eighteen months. Germination tests for the samples were conducted in a greenhouse. Two replications of sixty seeds each were used. Flats of autoclaved soil were prepared with individual holes being made in the soil to receive the seeds. The seeds were selected for freedom from visible mechanical damage and planted with the point of the kernel down.

The results of the test for shallow-bed drying are as follows:

(1) Moisture values obtained during drying of corn with 47.5% moisture.

TEMPERATURE OF DRYING AIR

| 186° F. | | 157° F. | | 139° F. | | 120° F. | |
|---|---|---|---|---|---|---|---|
| Time, min. | Moist. | Time, min. | Moist. | Time, min. | Moist. | Time, min. | Moist. |
| 0 | 47.5 | 0 | 47.5 | 0 | 47.5 | 0 | 47.5 |
| 43 | 28.5 | 50 | 26.9 | 96 | 24.6 | 156 | 27.0 |
| 81 | 19.8 | 88 | 20.3 | 159 | 19.6 | 294 | 20.7 |
| 120 | 14.6 | 140 | 15.1 | 197 | 16.6 | 372 | 17.6 |
| 181 | 10.6 | 197 | 11.5 | 304 | 11.4 | | |

(2) Moisture values obtained during drying of corn with 37.6% moisture.

TEMPERATURE OF DRYING AIR

| 186° F. | | 145° F. | | 134° F. | | 96° F. | |
|---|---|---|---|---|---|---|---|
| Time, min. | Moist. | Time, min. | Moist. | Time, min. | Moist. | Time, min. | Moist. |
| 0 | 37.6 | 0 | 37.6 | 0 | 37.6 | 0 | 37.6 |
| 28 | 27.7 | 35 | 26.2 | 46 | 27.0 | 95 | 28.3 |
| 58 | 22.0 | 60 | 24.4 | 103 | 22.1 | 294 | 19.9 |
| 96 | 17.1 | 115 | 18.0 | 208 | 14.4 | 341 | 18.9 |
| 158 | 11.8 | 298 | 12.5 | 348 | 12.5 | 566 | 14.6 |

(3) Moisture values obtained during drying of corn with 27.9% moisture.

TEMPERATURE OF DRYING AIR

| 186° F. | | 150° F. | | 134° F. | | 96° F. | |
|---|---|---|---|---|---|---|---|
| Time, min. | Moist. | Time, min. | Moist. | Time, min. | Moist. | Time, min. | Moist. |
| 0 | 27.9 | 0 | 27.9 | 0 | 27.9 | 0 | 27.9 |
| 47 | 18.7 | 49 | 18.9 | 28 | 23.2 | 37 | 24.7 |
| 93 | 13.6 | 139 | 13.5 | 58 | 20.9 | 181 | 18.9 |
| 165 | 10.0 | 247 | 10.0 | 143 | 14.9 | 347 | 14.7 |
| 238 | 7.8 | | | 292 | 10.4 | 649 | 11.4 |

(4) Germination percentages obtained after drying field shelled corn from three initial moisture levels to the various moisture levels shown in the above tables.

INITIAL MOISTURE

| 46.7% | | | 37.6% | | | 27.9% | | |
|---|---|---|---|---|---|---|---|---|
| Blotter | Sand | Cold 186° | Blotter | Sand | Cold 186° | Blotter | Sand | Cold 186° |
| 0.0 | 0.0 | 0.0 | 1.0 | 0.0 | 0.0 | 0.5 | 0.0 | 0.0 |
| 0.0 | 0.0 | 0.0 | 0.5 | 0.5 | 0.0 | 1.0 | 0.0 | 0.0 |
| 0.0 | 0.0 | 0.0 | 0.0 | 0.0 | 0.0 | 0.0 | 0.0 | 0.0 |
| 0.0 | 0.0 | 0.0 | 0.5 | 0.0 | 0.0 | 0.0 | 0.0 | 0.0 |
| 157° | | | 145° | | | 150° | | |
| 0.0 | 1.0 | 0.0 | 6.0 | 5.5 | 5.0 | | | |
| 0.5 | 0.0 | 0.0 | 11.0 | 6.0 | 4.0 | 76.6 | 63.5 | 31.0 |
| 1.0 | 1.0 | 0.0 | 8.0 | 2.5 | 2.0 | 77.0 | 50.0 | 31.0 |
| 0.5 | 1.0 | 0.0 | 6.5 | 5.0 | 1.0 | 73.5 | 39.0 | 16.0 |
| 139° | | | 134° | | | 134° | | |
| 60.0 | 53.0 | 10.0 | 24.5 | 31.5 | 25.0 | 96.5 | 88.5 | 65.0 |
| 35.0 | 19.5 | 7.0 | 68.0 | 42.0 | 23.0 | 98.5 | 88.0 | 68.0 |
| 27.5 | 10.5 | 5.0 | 83.0 | 40.0 | 29.0 | 99.0 | 85.5 | 54.0 |
| 23.5 | 28.0 | 2.0 | 76.5 | 39.0 | 25.0 | 8.0 | 80.5 | 48.0 |
| 120° | | | 96° | | | 96° | | |
| 0.0 | 59.0 | 6.0 | 69.0 | 54.0 | 45.0 | 96.5 | 89.5 | 63.0 |
| 94.0 | 76.0 | 46.0 | 98.5 | 75.0 | 58.0 | 99.5 | 88.0 | 58.0 |
| 96.5 | 77.5 | 38.0 | 98.0 | 78.5 | 54.0 | 98.5 | 87.5 | 67.0 |
| 99.0 | 75.0 | 32.0 | 99.0 | 82.0 | 58.0 | 100.0 | 91.5 | 65.0 |
| Check | | | Check | | | Check | | |
| 90.0 | 68.0 | 66.0 | 96.5 | 78.9 | 57.0 | 97.8 | 86.5 | 56.0 |

(5) The proportion of damaged seedlings observed in the sand test, given as a percentage of the total that germinated.

INITIAL MOISTURE

| 46.7% | 37.6% | 27.9% |
|---|---|---|
| 157° | 145° | 150° |
| -------- | 26 | -------- |
| -------- | 25 | 12 |
| ---------------- | | 9 |
| -------- | 10 | 6 |
| 139° | 134° | 134° |
| 32 | 35 | 3 |
| 57 | 19 | 6 |
| 36 | 18 | 12 |
| 29 | 15 | 25 |
| 120° | 96° | 96° |
| 46 | 33 | 10 |
| 6 | 9 | 5 |
| 14 | 6 | 5 |
| 13 | 9 | 6 |
| Check | Check | Check |
| 9 | 10 | 5 |

The study of deep-bed drying was conducted in bins which were essentially adiabatic. A close observation of the history of the grain environment throughout drying was possible. The only variables in the study were the initial moisture content and the air temperatures used in drying. The first four experimental bins contained grain of the highest initial moisture, 26.5%. Before the air was introduced into the grain it was first saturated at 44° F. and then heated to different temperatures by means of electrically controlled elements. The relative humidity (R.H.), the dry bulb temperature (D.B.) and the wet bulb temperature (W.B.) can be found below the final moisture contents of the samples for each bin. Mechanical failures prolonged the drying time in these bins and accentuated injury to the grain. The bins in this series contained each about four bushels of grain.

The bins of the other three series contained each about five bushels of grain. The rate of air flow was controlled so that five cubic feet of air traversed the grain column in one minute. This rate is described as 1 c.f.m./bu., meaning one cubic foot of air per bushel of grain per minute. A definite zone of drying was established in the grain and moved up through the column at an even rate. With a constant rate of air flow it is obvious that the time for the drying front to get halfway through the column could be equivalent approximately to one-half the drying time. Or to put it another way, the ventilation rate would have to be doubled to get the drying front through the entire column in the time that it presently takes for the front to reach the halfway mark. So then with respect to the time of drying with a rate of 1 c.f.m./bu., the effect on the grain at the middle of the column would be the same as that at the top of the column with 2 c.f.m./bu. This being so, we can consider the grain at the halfway mark of the column as being dried at an equivalent rate of 2 c.f.m./bu.; by the same token grain at the ¼ level may be considered as dried at a rate equivalent to 4 c.f.m./bu. Thus at any level in the bins the rate of ventilation for that region may be considered as the reciprocal of that level. For example, at the ⅜ level it is 1 c.f.m./bu.; at the ¾ level it is 1.33 c.f.m./bu.; at the ⅛ level it is 8 c.f.m./bu., etc. With a single rate of air flow data were supplied to cover a rather wide range of air flows in actual practice. The results of the study are as follows:

(6) Final moisture content of grain dried from 26.5% initial moisture, and the time in days required to dry the grain at the different levels down to about 16% moisture.

| Air temp.. | [1] 12° | | [1] 22° | | [1] 31° | | [1] 44° | |
|---|---|---|---|---|---|---|---|---|
| Bin No... | 1 | | 2 | | 3 | | 4 | |
| Level | Time, days | Percent mois. | Time, days | Percent mois. | Time, days | Percent mois. | Time, days | Percent mois. |
| 0 | ------ | 12.8 | ------ | 10.1 | ------ | 8.4 | ------ | 7.0 |
| 1 | 20 | 13.5 | 12 | 10.4 | ------ | 7.9 | 5 | 6.7 |
| 2 | ------ | 21.3 | 24 | 11.5 | ------ | 8.4 | 10 | 6.7 |
| 3 | ------ | 22.7 | 30 | 20.3 | ------ | 10.9 | 15 | 7.7 |
| 4 | ------ | 24.6 | ------ | 24.0 | ------ | 15.3 | 20 | 8.8 |
| W.B. | 49° | | 54° | | 57° | | 62° | |
| D.B. | 56° | | 66° | | 75° | | 88° | |
| R.H. | 63% | | 44% | | 33% | | 22% | |

| Air temp. | [2] 0° | | 9° | | 13° | | 18° | |
|---|---|---|---|---|---|---|---|---|
| Bin No... | 5 | | 6 | | 8 | | 10 | |
| Level | Time, days | Percent mois. | Time, days | Percent mois. | Time, days | Percent mois. | Time, days | Percent mois. |
| 0 | ------ | 14.6 | ------ | 9.7 | ------ | 7.7 | ------ | 7.3 |
| 1 | 5 | 14.2 | 2 | 9.4 | 1.5 | 7.4 | 1 | 6.4 |
| 2 | 11 | 13.9 | 6 | 9.3 | 5 | 7.3 | 4 | 6.2 |
| 3 | 21 | 13.5 | 9 | 9.1 | 7 | 7.5 | 6 | 6.3 |
| 4 | 28 | 13.7 | 12 | 9.3 | 9 | 8.1 | 8 | 6.5 |
| 5 | 32 | 14.2 | 17 | 9.2 | 13 | 8.3 | 12 | 6.9 |
| 6 | 41 | 14.7 | 20 | 9.8 | 15 | 8.4 | 14 | 7.7 |
| 7 | 50 | 15.6 | 24 | 10.2 | 18 | 8.7 | 16 | 8.2 |
| 8 | 55 | 17.9 | 29 | 11.4 | 22 | 9.5 | 19 | 9.5 |

[1] The starting air was saturated at 44° F. with wet bulb increments as indicated.
[2] Natural air with wet bulb temperature increments in the following bins as indicated.

(7) Final moisture content of grain dried from 24.6% and 18.8% initial moisture, and the time in days required to dry the different levels to about 16% moisture.

24.6% INITIAL MOISTURE

| Air temp.. | [1] 0° | | 9° | | 13° | | 18° | |
|---|---|---|---|---|---|---|---|---|
| Bin No... | 7 | | 11 | | 12 | | 13 | |
| Level | Time, days | Percent mois. | Time, days | Percent mois. | Time, days | Percent mois. | Time, days | Percent mois. |
| 0 | ------ | 15.3 | ------ | 10.1 | ------ | 7.9 | ------ | 7.4 |
| 1 | 4 | 14.4 | 2 | 9.2 | 1.5 | 7.5 | 1 | 6.6 |
| 2 | 8 | 14.2 | 4.5 | 9.1 | 4 | 7.1 | 3.5 | 6.4 |
| 3 | 11 | 13.8 | 7 | 8.8 | 7 | 7.1 | 5.5 | 6.5 |
| 4 | 20 | 13.9 | 14.5 | 9.0 | 10 | 7.5 | 8 | 6.7 |
| 5 | 24 | 13.7 | 17.5 | 9.1 | 13 | 7.8 | 10 | 6.6 |
| 6 | 29 | 14.1 | 22.5 | 9.1 | 15 | 7.7 | 12 | 7.1 |
| 7 | 38 | 14.1 | 27.5 | 9.3 | 18 | 8.9 | 13.5 | 7.2 |
| 8 | 43 | 17.3 | 35.5 | 10.7 | 21 | 9.9 | 16 | 16.6 |

18.8% INITIAL MOISTURE

| Air temp.. | [1] 0° | | 9° | | 13° | | 18° | |
|---|---|---|---|---|---|---|---|---|
| Bin No... | 9 | | 14 | | 15 | | 16 | |
| Level | Time, days | Percent mois. | Time, days | Percent mois. | Time, days | Percent mois. | Time, days | Percent mois. |
| 0 | ------ | 12.0 | ------ | 8.5 | ------ | 7.0 | ------ | 8.4 |
| 1 | 3 | 12.0 | 3 | 8.2 | 2 | 6.5 | 2 | 6.9 |
| 2 | 6 | 12.0 | 5 | 8.3 | 4 | 6.7 | 3.5 | 6.5 |
| 3 | 10 | 12.5 | 7 | 8.8 | 5 | 7.1 | 5 | 6.7 |
| 4 | 14 | 12.4 | 9 | 9.0 | 7 | 7.5 | 6 | 6.0 |
| 5 | 17 | 12.8 | 11 | 9.0 | 9 | 7.8 | 8 | 6.2 |
| 6 | 21 | 13.3 | 15 | 9.5 | 11 | 8.1 | 10 | 7.0 |
| 7 | 23 | 14.4 | 17 | 10.1 | 14 | 8.5 | 11.5 | 7.6 |
| 8 | 27 | 16.6 | 21.5 | 11.8 | 16 | 9.2 | 13 | 8.6 |

[1] Natural air with wet bulb temperature increments in the following bins as indicated.

(8) Germination percentages after six months and after eighteen months of corn dried from 26.5% initial moisture and kept in cold storage.

| Air Temp | [1] 12° | | [1] 22° | | [1] 31° | | [1] 44° | |
|---|---|---|---|---|---|---|---|---|
| Bin No | 1 | | 2 | | 3 | | 4 | |
| Level | 6 mo. | 18 mo. | 6 mo. | 18 mo. | 6 mo. | 18 mo. | 6 mo. | 18 mo. |
| 0 | 88 | 91 | 95 | 92 | 93 | 92 | 89 | 92 |
| 1 | 50 | 55 | 62 | 53 | 70 | 68 | 67 | 66 |
| 2 | 34 | 3 | 44 | 42 | 49 | 51 | 50 | 49 |
| 3 | 42 | 0 | 50 | 12 | 43 | 51 | 47 | 36 |
| 4 | 14 | 0 | 20 | 0 | 53 | 49 | 45 | 34 |

| Air Temp | [2] 0° | | 9° | | 13° | | 18° | |
|---|---|---|---|---|---|---|---|---|
| Bin No | 5 | | 6 | | 8 | | 10 | |
| Level | 6 mo. | 18 mo. | 6 mo. | 18 mo. | 6 mo. | 18 mo. | 6 mo. | 18 mo. |
| 0 | 80 | 85 | 90 | 87 | 88 | 85 | 77 | 88 |
| 1 | 89 | 89 | 89 | 89 | 90 | 87 | 85 | 89 |
| 2 | 75 | 76 | 83 | 79 | 88 | 83 | 83 | 77 |
| 3 | 66 | 74 | 76 | 76 | 68 | 69 | 71 | 69 |
| 4 | 59 | 59 | 65 | 60 | 65 | 70 | 64 | 65 |
| 5 | 52 | 64 | 63 | 53 | 61 | 58 | 64 | 65 |
| 6 | 54 | 58 | 58 | 59 | 65 | 51 | 57 | 64 |
| 7 | 56 | 62 | 61 | 67 | 58 | 62 | 63 | 60 |
| 8 | 45 | 23 | 56 | 62 | 72 | 54 | 61 | 66 |

[1] Starting air was saturated at 44° F. with wet bulb increments as indicated.
[2] Natural air with wet bulb temperature increments in the following bins as indicated.

(9) Germination percentages after six months and after eighteen months of corn dried from 24.6% and 18.8% initial moisture and kept in cold storage.

24.6% INITIAL MOISTURE

| Air Temp | [1] 0° | | 9° | | 13° | | 18° | |
|---|---|---|---|---|---|---|---|---|
| Bin No | 7 | | 11 | | 12 | | 13 | |
| Level | 6 mo. | 18 mo. | 6 mo. | 18 mo. | 6 mo. | 18 mo. | 6 mo. | 18 mo. |
| 0 | 84 | 89 | 92 | 95 | 83 | 86 | 93 | 91 |
| 1 | 87 | 78 | 92 | 89 | 91 | 89 | 87 | 95 |
| 2 | 81 | 80 | 80 | 85 | 88 | 83 | 88 | 91 |
| 3 | 75 | 70 | 69 | 75 | 63 | 56 | 62 | 69 |
| 4 | 68 | 68 | 62 | 52 | 56 | 55 | 53 | 65 |
| 5 | 63 | 64 | 50 | 56 | 51 | 55 | 52 | 56 |
| 6 | 60 | 67 | 43 | 55 | 49 | 45 | 52 | 42 |
| 7 | 60 | 64 | 54 | 52 | 43 | 53 | 62 | 54 |
| 8 | 64 | 67 | 52 | 47 | 50 | 52 | 58 | 54 |

18.8% INITIAL MOISTURE

| Air Temp | [1] 0° | | 9° | | 13° | | 18° | |
|---|---|---|---|---|---|---|---|---|
| Bin No | 9 | | 14 | | 15 | | 16 | |
| Level | 6 mo. | 18 mo. | 6 mo. | 18 mo. | 6 mo. | 18 mo. | 6 mo. | 8 mo. |
| 0 | 68 | 85 | 83 | 93 | 95 | 90 | 90 | 89 |
| 1 | 85 | 89 | 80 | 88 | 90 | 90 | 90 | 90 |
| 2 | 83 | 83 | 90 | 91 | 95 | 87 | 82 | 83 |
| 3 | 93 | 83 | 78 | 89 | 92 | 92 | 89 | 91 |
| 4 | 92 | 88 | 83 | 79 | 97 | 86 | 88 | 83 |
| 5 | 85 | 91 | 73 | 83 | 90 | 78 | 90 | 82 |
| 6 | 87 | 85 | 85 | 89 | 82 | 83 | 77 | 73 |
| 7 | 88 | 88 | 87 | 84 | 85 | 81 | 78 | 78 |
| 8 | 88 | 87 | 83 | 79 | 90 | 71 | 85 | 69 |

[1] Natural air with wet bulb temperature increments in the following bins as indicated.

(10) The seedlings emerged after five days, given as a percentage of the total that germinated, and the total germination percentage of the samples held in storage and germinated after six months and after eighteen months.

After six months with moisture contents:

Under 10%: Percent
   Germination _____ 74
   Emergence _____ 75
10 to 12%:
   Germination _____ 65
   Emergence _____ 70

12 to 14%:                                                     Percent
   Germination _____ 75
   Emergence _____ 47
14 to 16%:
   Germination _____ 70
   Emergence _____ 56
16 to 18%:
   Germination _____ 74
   Emergence _____ 59
18 to 24%:
   Germination _____ 42
   Emergence _____ 33
Above 24%:
   Germination _____ 17
   Emergence _____ 0

After eighteen months with moisture contents:

Under 10%:                                                     Percent
   Germination _____ 73
   Emergence _____ 84
10 to 12%:
   Germination _____ 69
   Emergence _____ 91
12 to 14%:
   Germination _____ 75
   Emergence _____ 93
14 to 16%:
   Germination _____ 73
   Emergence _____ 86
16 to 18%:
   Germination _____ 71
   Emergence _____ 88
18 to 24%:
   Germination _____ 13
   Emergence _____ 53
Above 24%:
   Germination _____ 0
   Emergence _____ 0.0

(11) The seedlings emerged after five days, given as a percentage of the total that germinated in samples dried from 26.5% initial moisture.

| Air Temp | [1] 12° | [1] 22° | [1] 31° | [1] 44° | [2] 0 | 9° | 13° | 18° |
|---|---|---|---|---|---|---|---|---|
| Bin No | 1 | 2 | 3 | 4 | 5 | 6 | 8 | 10 |
| Level: | | | | | | | | |
| 0 | 90.1 | 81.6 | 78.6 | 93.4 | 88.7 | 91.3 | 77.1 | 85.7 |
| 1 | 95.4 | 91.5 | 94.0 | 90.0 | 94.3 | 91.1 | 78.7 | 88.9 |
| 2 | 40.0 | 98.7 | 97.0 | 90.7 | 93.4 | 91.1 | 78.7 | 88.9 |
| 3 | | 60.0 | 94.1 | 92.8 | 86.4 | 92.1 | 84.6 | 95.6 |
| 4 | | | 94.8 | 95.4 | 94.9 | 90.7 | 80.0 | 96.8 |
| 5 | | | | | 95.6 | 92.3 | 80.8 | 95.3 |
| 6 | | | | | 95.6 | 97.4 | 84.0 | 94.4 |
| 7 | | | | | 98.3 | 93.2 | 89.4 | 94.1 |
| 8 | | | | | 67.3 | 93.4 | 88.0 | 89.3 |

[1] Starting air was saturated at 44° F. with wet bulb increments as indicated.
[2] Natural air with wet bulb temperature increments as indicated.

(12) The seedlings emerged after five days, given as a percentage of the total that germinated in samples dried from 24.6 and 18.8% initial moisture contents.

| Air Temp | [1] 0 | 9° | 13° | 18° | [1] 0° | 9° | 13° | 18° |
|---|---|---|---|---|---|---|---|---|
| Bin No | 7 | 11 | 12 | 13 | 9 | 14 | 15 | 16 |
| Level: | | | | | | | | |
| 0 | 90.9 | 87.8 | 72.5 | 85.1 | 87.0 | 87.0 | 88.8 | 85.9 |
| 1 | 86.9 | 89.5 | 80.3 | 84.1 | 93.2 | 85.6 | 88.3 | 83.8 |
| 2 | 94.3 | 91.7 | 77.5 | 88.1 | 95.1 | 85.1 | 92.0 | 83.7 |
| 3 | 97.9 | 88.0 | 82.1 | 84.7 | 92.1 | 76.9 | 84.7 | 84.0 |
| 4 | 91.1 | 93.2 | 82.5 | 80.6 | 96.4 | 80.3 | 90.0 | 87.4 |
| 5 | 93.7 | 91.0 | 81.6 | 89.1 | 88.3 | 77.4 | 77.4 | 83.3 |
| 6 | 91.7 | 89.9 | 87.7 | 88.0 | 97.0 | 83.1 | 84.3 | 82.6 |
| 7 | 93.7 | 91.3 | 87.5 | 94.3 | 93.1 | 86.3 | 87.7 | 91.0 |
| 8 | 91.6 | 91.3 | 82.5 | 87.9 | 95.4 | 87.2 | 86.9 | 88.4 |

[1] Natural air with wet bulb temperature increments as indicated.

From the above data it is found that there are many interplaying factors which complicate the drying of high moisture shelled corn. Experiments with shallow-bed drying under conditions of high air volumes indicate that increases of temperature above certain levels may not be practical, even when considering drying time alone. Moreover, if conditions of air volume are more restricted, then increase of temperature would be even more impractical, particularly from the standpoint of rapid drying. Besides drying time there is the important consideration of the direct effect of heat.

The results of this study have indicated that under any conditions of initial moisture, temperatures of 186° F. were almost totally destructive of grain viability after several hours of drying. Air temperatures of 150° F. were found to destroy viability of grain harvested at 32% initial moisture; with grain of 27.3% moisture the damage was somewhat less. Even the 21.8% moisture grain showed serious damage with 150° air. Damage to grain may or may not be visible; with high heat there may occur chemical alteration of kernel constituents rendering the grain inviable and unsuitable for wet milling. It was found that grain dried rapidly was brittle and broke up readily with handling; such damage may be increased in rapid drying systems which circulate the grain in drying, and unsoundness in grain greatly increases the hazard of storage, since cracked and broken grain absorbs more atmospheric moisture than whole kernels, establishing as a consequence conditions more favorable for insect and microbial activity.

A temperature of 134° F. affected viability and vigor of grain dried from 27.3% initial moisture, whereas corn with an initial moisture of 21.7% seemed not to lose viability at this temperature, though loss of vigor was apparent. When 32.1% initial moisture grain was dried with 120° air viability was better than that of the check, though loss of vigor seemed associated with duration of exposure. When the 27.3% moisture corn was dried with 96° air there was no evidence of decreased vigor, and viability appeared better than in the check sample. It has been observed that 25% moisture corn can be dried safely with 125° air. Similarly the experiments have shown that grain of 21.7% initial moisture was dried with 134° air without affecting germinability, however some damage to vigor seemed indicated. Grain of 32.1% initial moisture dried with 120° air showed no damage to germinability, but again there was evidence of loss of vigor. Such conditions may be close to the borderline of damage and no-damage. If the grain were intended for seed purposes such temperatures would not be recommended; however, if the grain is intended for feed these temperatures may be acceptable.

The temperature tolerances as indicated by these data are considered applicable to instorage drying, assuming that air volume is adequate and recognizing that overdrying in some instances may occur.

Studies of deep-bed drying have been undertaken to observe conditions of safe minimum air volumes. The higher the moisture content of the grain, the shorter is the time allowable for drying to prevent quality loss. Previous studies have indicated that up to a 1% loss of dry matter may be permitted without serious damage to grain quality; such a loss corresponded to a 14.7 g. carbon dioxide evolution per kg. of dry grain. Germination studies have indicated that such a loss in dry matter may be associated with an 80% germination value; germination decreasing as dry weight loss increased. Addition of heat to the drying air raises the grain temperature and increases the respiratory rate, which in turn increases the rate of loss of dry weight. To compensate for the accelerated respiratory rate the grain needs to be dried more rapidly; for this reason increases of temperature in deep-bed drying generally increase the air volume requirements.

Working with wet bulb temperature increments of 9°, 13°, and 18° F. and with air volumes of 1 c.f.m./bu., effects of drying were observed in grain of three initial moistures, 26.5%, 24.6%, and 18.8%. Intolerable damage inflicted on grain quality is assumed to be represented by germination values less than 80%, which seems to correspond with a probable 1% loss of initial dry weight of kernels.

An observation of the germination results obtained with grain dried from 26.5% initial moisture indicates that about ten days would be maximum safe time within which this grain could be safely dried under conditions of natural air with an equivalent ventilation rate of about 6 c.f.m./bu. A wet bulb temperature increment of 9° over ambient air conditions showed that drying was accomplished in about seven days with a ventilation rate of about 4 c.f.m./bu.; a 13° wet bulb temperature increment showed safe drying completed after about five days with a ventilation rate of 4 c.f.m./bu.; an 18° wet bulb temperature increment with an air flow rate of 4 c.f.m./bu. showed drying accomplished in about four days.

The data obtained with the 24.6% initial moisture grain show that 4 c.f.m./bu. was adequate, and accomplished drying in about nine days when natural air was used; a 9° increment completed drying in about six days with an air flow requirement of about 3 c.f.m./bu. A 13° wet bulb temperature increment accomplished drying in about five days with the same air flow requirement, while an 18° increment completed drying about one day sooner under the same air volumes.

Results obtained with the 18.8% initial moisture corn indicate that an air flow rate of 1 c.f.m./bu. was adequate with natural air. Thirty days were required to complete drying but the grain remained in good condition. A 9° wet bulb temperature increment shortened drying time to about twenty-three days, though it appeared that a ventilation rate of 1 c.f.m./bu. was hardly adequate; the data obtained in samples dried with 13° and 18° F. increments indicate that though the grain had not been dried to a safe final moisture after sixteen and thirteen days respectively, nevertheless drying conditions were satisfactory for preserving grain quality.

It is important to establish minimum rates of air flow in grain drying, since to increase the ventilation rate twofold in a given depth of grain, the required increase of fan power is nearly sixfold, while the drying rate can only be doubled. Thus efficiency in drying would be measured in terms of maximum utilization of the moisture carrying capacity of air passed through the grain. Higher rates of air flow will increase the temperature tolerability and reduce drying time, whereas slow ventilation rates reduce the temperature tolerability and extend drying time.

As a result of these studies the following method of conditioning corn, for the maximum preservation of quality, was developed.

When the moisture of the corn in the field gets down to approximately 27% the farmer begins field shelling and transports the grain to the conditioning bin. This early harvesting is conventional among farmers and is based on the findings that field shelling and handling of corn having a greater moisture content will break and crack the outer shell of the kernel.

The shelled corn is then deposited in a conventional bin having a closeable roof opening, a plenum chamber defined by the bottom of the bin and a perforated floor, an air blower operable to force air into the plenum chamber, and a heater attached to the blower for heating the air blown into the plenum chamber when desired. Thus, upon engagement of the fan, air will be blown into the bin and through the grain deposited on the floor to carry off moisture and properly condition the corn. A thermometer equipped for measuring dry bulb and wet bulb temperatures and a manometer are connected to the plenum of the bin for the purpose of giving readings of the temperature and static pressure of the air therein.

As the grain is deposited in the bin the fan is engaged and incidentally winnows away chaff and leaves. Foreign matter, as chaff and leaves, in the grain will cause uneven conditioning and retard the conditioning rate. The grain should also be deposited in a manner wherein the level throughout the bin will be substantially equal to obtain maximum utilization of the air stream. The bin may be filled either in stages of from four to eight feet of level grain at a time depending on moisture content and allowing a sufficient time to elapse for each stage or layer to dry before adding more, or it may be filled at a steady daily rate of fill as determined by the capacity of the bin and blowers. A normal safe rate of fill for various bin diameters and blower capacities has been determined as follows:

(1)

| Bin Diameter | Bushels of Corn | |
|---|---|---|
| | Per Foot | Per Day [1] |
| 14′ | 122 | 200 |
| 18′ | 205 | 400 |
| 21′ | 273 | 500 |
| 24′ | 356 | 700 |
| 27′ | 455 | 900 |
| 36′ | 810 | 1,700 |
| 42′ | 1,115 | 2,300 |
| 48′ | 1,460 | 2,900 |

[1] Normal daily fill rate.

Filling of the bin may continue as long as the required c.f.m./bu. is satisfied as shown on the following chart based on the percentage of moisture of the incoming grain.

2.—REQUIRED C.F.M./BU.

| Percent moisture: | C.f.m./bu. |
|---|---|
| 30 | 9.0 |
| 28 | 7.0 |
| 25 | 5.0 |
| 22 | 3.5 |
| 20 | 2.5 |
| 18 | 1.5 |

The formula for determining the required c.f.m./bu. is:

C.f.m./bu.=total c.f.m.÷total bushels with the total c.f.m. determined by a reading of the manometer in the plenum and the corresponding capacity as shown hereinbelow on the Air Delivery Rate Table. However, the manometer can be calibrated to give a direct reading of c.f.m. instead of inches static pressure thus eliminating the requirement that the Air Delivery Rate Table be consulted.

3.—AIR DELIVERY RATES*

| | Air Volume: Cubic Feet of Air per Minute (c.f.m.) | | | | | | | |
|---|---|---|---|---|---|---|---|---|
| Bin Diam. | Inches Static Pressure (S.P.) | | | | | | | |
| | 0.5 | 1.0 | 1.5 | 2.0 | 2.5 | 3.0 | 3.5 | 4.0 |
| 14–21′ | 11,300 | 10,790 | 10,250 | 9,680 | 9,110 | 8,520 | 7,880 | 7,120 |
| 24–36′ | 22,600 | 21,580 | 20,500 | 19,360 | 18,220 | 17,040 | 15,760 | 14,240 |
| 42–48′ | 33,900 | 32,370 | 30,750 | 29,040 | 27,330 | 25,560 | 23,640 | 21,360 |
| 42–48′ | 37,890 | 36,390 | 34,860 | 33,330 | 31,770 | 30,075 | 28,230 | 26,220 |

*Will vary with design and size of fan employed.

As the bin is being filled the fan is left engaged for drying. If the ambient air temperature is between 50–70° F., the heater is not normally engaged. If the ambient air temperature drops below 50° F., as is often the case during the harvesting season, the heater is engaged to bring the plenum temperature up to approximately 60° F. Normal drying which occurs in these temperature ranges will not reduce corn moisture below 12%. More precise control of drying may be accomplished by regulating heat input in relation to the wet bulb depression of the temperature in the plenum.

Chart 4 shows the equilibrium moisture content. The purpose of this chart is to obtain a more accurate control of the final moisture content of the corn. To use the chart the farmer obtains a dry bulb and a wet bulb temperature depression reading of the air in the plenum. These two readings are used to measure the evaporation ability capacity of the air, or the measure of the actual relative humidity. By utilizing these two readings and a standard psychrometric chart the relative humidity can be obtained. However, Chart 4 (Grain Equilibrium Chart) goes one step further and translates immediately the dry bulb and wet bulb temperature depression into final grain moisture content, thus by-passing the need to arrive at the relative humidity factor and the moisture of the grain.

tional corn can be deposited in the bin as long as minimum ventilation rate is maintained. This process continues

CHART 4.—GRAIN-MOISTURE EQUILIBRIUM CHART

| Plenum Dry-Bulb Temperature (Degrees Fahrenheit) | Plenum Wet-Bulb Temperature Depression (Degrees Fahrenheit) | | | | | | | | | | | | | | | | | | | |
|---|---|---|---|---|---|---|---|---|---|---|---|---|---|---|---|---|---|---|---|---|
| | 42° | 44° | 46° | 48° | 50° | 52° | 54° | 56° | 58° | 60° | 62° | 64° | 66° | 68° | 70° | 72° | 74° | 76° | 78° | 80° |
| 50° | 11.9 | 13.7 | 15.4 | 18.8 | 26.5 | | | | | | | | | | | | | | | |
| 52° | 10.9 | 12.6 | 14.2 | 16.9 | 22.6 | 26.3 | | | | | | | | | | | | | | |
| 54° | 9.9 | 11.5 | 13.0 | 15.0 | 18.7 | 21.9 | 26.0 | | | | | | | | | | | | | |
| 55° | 8.9 | 10.4 | 11.8 | 13.1 | 14.8 | 17.5 | 23.4 | | | | | Percentage Moisture Content | | | | | | | | |
| 56° | | | 10.7 | 12.0 | 13.7 | 15.8 | 20.3 | 25.8 | | | | | | | | | | | | |
| 58° | | | 9.7 | 11.1 | 12.6 | 14.1 | 17.2 | 19.3 | 25.6 | | | | | | | | | | | |
| 60° | | | 8.7 | 10.2 | 11.5 | 12.5 | 14.1 | 15.9 | 19.4 | 25.4 | | | | | | | | | | |
| 62° | | | | | 10.5 | 11.7 | 13.1 | 14.7 | 17.1 | 21.8 | 25.2 | | | | | | | | | |
| 64° | | | | | 9.5 | 10.9 | 12.1 | 13.4 | 14.8 | 18.3 | 21.3 | 24.9 | | | | | | | | |
| 65° | | | | | 8.5 | 10.1 | 11.2 | 12.1 | 12.5 | 14.8 | 17.4 | 21.9 | | | | | | | | |
| 66° | | | | | | | 10.2 | 11.4 | 12.0 | 13.8 | 15.8 | 19.2 | 24.7 | | | | | | | |
| 68° | | | | | | | 9.2 | 10.6 | 11.6 | 12.7 | 14.3 | 16.6 | 19.3 | 24.5 | | | | | | |
| 70° | | | | | | | 8.2 | 9.8 | 11.1 | 11.7 | 12.8 | 14.0 | 15.9 | 18.5 | 24.3 | | | | | |
| 72° | | | | | | | | | 10.1 | 11.0 | 12.1 | 13.0 | 14.7 | 16.8 | 21.2 | 24.0 | | | | |
| 74° | | | | | | | | | 9.0 | 10.3 | 11.4 | 12.1 | 13.5 | 15.1 | 18.1 | 19.7 | 23.8 | | | |
| 75° | | | | | | | | 7.9 | 9.6 | 10.7 | 11.2 | 12.3 | 13.4 | 15.0 | 16.6 | 21.0 | 23.7 | | | |
| 76° | | | | | | | | | | | 9.6 | 10.6 | 11.6 | 12.5 | 13.9 | 15.4 | 18.7 | 23.6 | | |
| 78° | | | | | | | | | | | 8.4 | 10.0 | 10.9 | 11.6 | 12.6 | 14.1 | 16.4 | 18.3 | 23.4 | |
| 80° | | | | | | | | | | | 7.3 | 9.4 | 10.2 | 10.8 | 11.5 | 12.9 | 14.2 | 15.6 | 17.8 | 23.2 |

CORN-MOISTURE EQUILIBRIUM CHART

Hygranograph = Grain Moisture Chart.
Hygranometer = Grain Moisture Indicator.
Hygranometric Chart = Grain Moisture Chart.

For example, for a 60° F. dry-bulb temperature of the air in the plenum and a 56° F. wet-bulb temperature depression of the air in the plenum the chart gives a final moisture content of the grain in the bin as 19.4%. This final moisture content would not be satisfactory, as hereinbefore disclosed, therefore heat must be added to the air in the plenum. If too much heat is added the final moisture content will fall below the chart range thus indicating to the farmer that adjustments must be made to the temperature of the incoming air. Thus by registration of the air temperature relative to the dry-bulb temperature and wet-bulb temperature depression the desired final grain moisture content can readily be obtained.

Upon the completion of the filling cycle the fan and heat if required are left engaged.

On the following morning the farmer checks the manometer and refers to the air delivery rate of his fan at the pressure reading. By dividing the bushels of wet grain (within the bin) into air volume passing through the grain, the c.f.m./bu. is determined. If the calculated figure is greater than the required c.f.m./bu. as based on the percent moisture content of the grain, additional grain can be deposited in the bin. If only one bin is used for conditioning the grain then the daily harvesting rate for each day can readily be established. The procedure of checking the static pressure on the manometer is continued until the harvesting is completed or the bin is filled. It can readily be seen that the conditioning of the grain is properly controlled as to temperature and air volume, thus allowing the farmer to obtain maximum quality.

The following is an example of the use of the above tables.

Given:
A 36 foot diameter grain bin.
A blower having an air delivery rate corresponding to a 24' to 36' diameter bin as shown on Table 3.
Shelled corn harvested at 30% moisture content.

From Table 1, the safe filling rate per day for a 36' bin is read as 1700 bushels. From Table 2 the required air flow rate is read as 9 c.f.m./bu. for grain having a 30% moisture content. Therefore the required air volume for 1700 bu. of shelled corn at 30% moisture content is determined by multiplying 9 c.f.m/bu. times 1700 bu. or 15,300 c.f.m. The manometer is then checked the following morning to determine the static pressure. If the static pressure reads 2" the capacity of the blowers is not being fully utilized as 19,360 c.f.m. is available but only 15,300 c.f.m. is required, as determined above, and additional corn can be deposited in the bin as long as minimum ventilation rate is maintained. This process continues until the bin is filled. If in a given day the air requirement in c.f.m., as determined at a given static pressure, is less than the required c.f.m. as determined by multiplying the c.f.m./bu. (Table 2) times the quantity of corn in the bin additional corn is not added. It will be noted that the manometer can be calibrated in air delivery rates instead of static pressure this simplifying the steps outlined above.

Of note, applicant has developed a novel psychrometer which permits obtaining a wet-bulb reading of temperature in the air chamber permitting an exact determination of how dry corn will get. As is known in the art, the con-conventional psychrometer (sling) involves the rotation of a member which has previously been wetted, in order to obtain the dry and wet-bulb temperatures. Upon creating an air flow stream outwardly from the plenum by the use of the air within the plenum, by inserting a stationary wetted member into the stream, a static type psychrometer is obtained having a much higher degree of accuracy as compared to the centrifugal type.

Although a preferred embodiment of this invention has been described and disclosed hereinbefore, it is to be remembered that various modifications and alternate procedures can be made thereto without departing from the true spirit and scope of the invention as defined in the appended claims.

I claim:

1. The process of conditioning grain in a bin having a closeable roof opening, a plenum chamber defined by the bottom of the bin and a perforated floor, an air blower operable to force air into the plenum chamber, and a heater attached to the blower for heating the air blown into the plenum chamber when desired, the process comprising:

depositing the grain into the bin and on to the floor in a lever manner;

operating the blower to force air into the plenum chamber for circulation of the air through the grain;

measuring the dry-bulb and wet-bulb temperatures of the air within the plenum;

measuring the static pressure of the air within the plenum;

relating the static pressure to the capacity of the air blower for obtaining cubic feet per minute delivery of the blower to predetermined volumes of grain as grain moisture warrants;

continuing the depositing of grain into the bin while maintaining a predetermined ratio of said cubic feet per minute of air delivered by the blower to the number of bushels deposited; and continuing the circulation of air through the grain at predetermined temperature levels with the ratio of air volume to grain volume and moisture content proportioned so as to minimize chemical change and loss of viability while maximizing effective use of air.

2. The process of conditioning grain as defined in claim 1, and further wherein the heater is operated to maintain said plenum chamber air at 50° to 70° F. when the ambient air temperature drops below 50° F.

3. The process of conditioning grain as defined in claim 1, and further wherein the temperature and static pressure of the plenum chamber air are measured respectively by a thermometer and manometer attached to a side wall of the plenum.

4. The process of conditioning grain as defined in claim 1, and further wherein the final moisture content is determined by use of a static psychrometer attached to a side wall of the plenum.

References Cited

UNITED STATES PATENTS

| | | | |
|---|---|---|---|
| 2,799,947 | 7/1957 | Elwess | 34—15 |
| 2,895,400 | 7/1959 | Topf | 34—15 X |
| 2,929,154 | 3/1960 | Finnegan | 34—15 X |
| 3,280,473 | 10/1966 | Sullivan | 34—15 |

WILLIAM J. WYE, *Primary Examiner.*